April 1, 1958 E. KÄSS 2,829,201
HYBRID SYSTEM FOR USE IN RADIO TELEPHONY
Filed Nov. 21, 1955
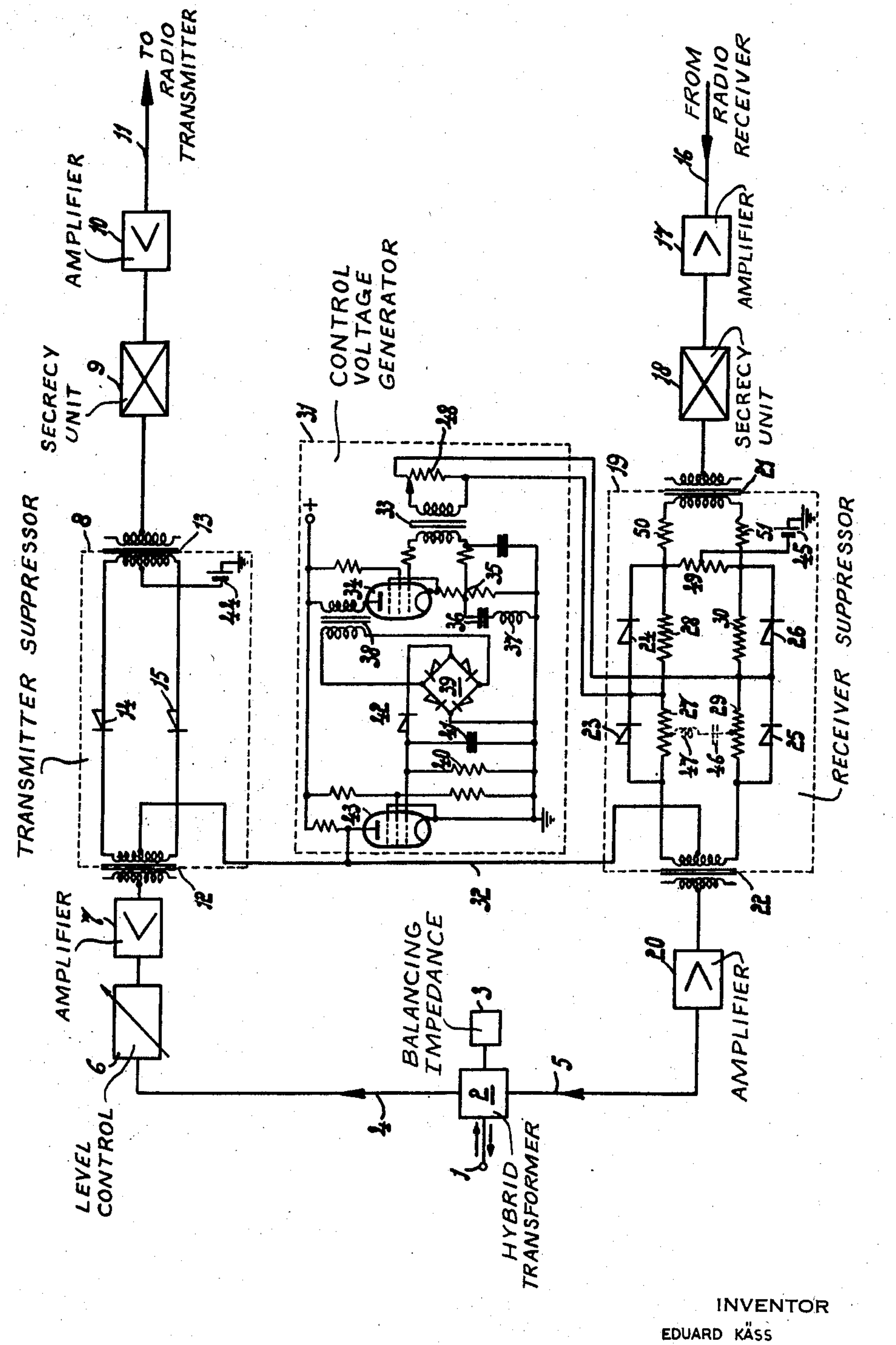
INVENTOR
EDUARD KÄSS
BY Fred M. Vogel
AGENT United States Patent Office 2,829,201

Patented Apr. 1, 1958

2,829,201

HYBRID SYSTEM FOR USE IN RADIO TELEPHONY

Eduard Käss, Hilversum, Netherlands, assignor, by mesne assignments, to North American Philips Company, Inc., New York, N. Y., a corporation of Delaware Application November 21, 1955, Serial No. 548,220

Claims priority, application Netherlands December 14, 1954

3 Claims. (Cl. 179—1)

The present invention relates to a radio-telephone hybrid system. More particularly, the invention relates to hybrid systems for use in radio telephony comprising a hybrid transformer connected on the one hand to a transmitting or "go" branch provided with a transmitter suppressor and on the other hand to a receiving or "return" branch provided with a receiver suppressor, the suppressors being jointly and oppositely controlled by a control-voltage generator.

It is an object of the invention to provide a simple, conveniently arranged and readily controllable hybrid system of the above mentioned type in which the receiver suppressor can also be utilized as a noise suppressor.

According to the invention, in a hybrid system of the kind described in the preamble, the receiver suppressor is cut off in the normal position and provided with series branches each comprising the series arrangement of two diodes shunted by shunt resistors. The control voltage generator contains an amplifier which is tuned to the most important speech frequency components and which has an input circuit connected to the junctions of the series-connected diodes of the receiver suppressor.

In order to prevent noise from the receiver branch from appearing in the transmitter branch it has proved to be of advantage to provide each of the shunt resistors of the diodes arranged at the hybrid transformer side of the receiver suppressor with a tapping point and to connect a resonant circuit which is tuned to the most important speech frequency components between said tapping points.

In order that the invention may be readily put into practice it will now be described in detail with reference to the accompanying drawing, wherein the single figure is a schematic diagram of an embodiment of the system of the present invention.

In the figure, reference numeral 1 designates a connecting terminal of a hybrid system to which a normal two-wire subscriber's line can be connected. The terminal 1 is connected to a hybrid transformer 2 which is provided with a balancing impedance 3. The hybrid transformer 2 is connected through a line 4 to a transmitter branch and through a line 5 to a receiver branch.

The transmitter branch comprises in succession a level control 6 which is manually adjustable, an amplifier 7, a transmitter suppressor 8, a secrecy arrangement 9 and an output amplifier 10 which is coupled through a line 11 to a radio transmitter (not shown). In the embodiment shown, the transmitter suppressor consists of a static relay comprising an input transformer 12, an output transformer 13 and two series branches containing series diodes 14 and 15, respectively, the anodes of which are connected to the primary winding of the output transformer 13.

The receiver branch comprises, reckoned from a radio receiver (not shown) which is connected to an input line 16, a separating amplifier 17, a secrecy arrangement 18, a receiver suppressor 19 and an output amplifier 20 which is connected to the hybrid transformer 2 through the line 5.

The secrecy arrangements 9 and 18 preferably are of a simple type and are immaterial to an understanding of the invention.

The receiver suppressor 19 comprises two series branches which are connected between the ends of the secondary winding of an input transformer 21 and the primary winding of an output transformer 22.

The series branches each comprise the series connection of two diodes 23, 24 and 25, 26 respectively, which diodes are shunted by shunt resistors 27, 28 and 29, 30, respectively.

In this arrangement, the suppressors are controlled jointly and oppositely by means of a control voltage which is derived from a control voltage generator 31 and is supplied simultaneously through a control lead 32 to the transmitter suppressor 8 and the receiver suppressor 19.

In order to generate the control voltage required for the suppressor control, use is made of an amplifier which is tuned to the most important speech frequency components and the input circuit of which is connected through a transformer 33 to the junctions of the series connected diodes 23, 24 and 25, 26, respectively, of the receiver suppressor 19. The use of the selective amplifier provides a favorable discrimination against noise signals. This amplifier comprises an amplifier tube in the form of a pentode 34 in the cathode lead of which a negative feedback resistor 35 is connected. Part of the resistor 35 is shunted by a series resonant circuit which is tuned to the most important speech frequency components (from 700 to 900 cycles per second) and comprises a capacitor 36 and a coil 37. The voltage set up at the anode of the pentode 34 is supplied via a transformer 38 to a rectifier arrangement 39. The output impedance of this rectifier arrangement comprises an output capacitor 41 which is bridged by a leak resistor 40 and is connected through a series diode 42 to the rectifier arrangement 39. The output capacitor 41 is connected in the control grid circuit of a pentode 43 which is connected as a direct current amplifier and is normally conductive. The anode voltage of the pentode 43, through the control lead 32, which is connected to the secondary winding of the transmitter suppressor input transformer 12 and to the primary winding of the receiver suppressor output transformer 22, provides a joint control of the transmitter suppressor 8 and the receiver suppressor 19.

A number of operating conditions of the hybrid arrangement shown will now be described more fully.

1. *Normal position*

In the normal position there are no speech signals either in the transmitter branch or in the receiver branch. In this normal position the control voltage generator 31 provides no output voltage. Due to the provision of a bias supply source 44 connected to the transmitter suppressor 8 the latter is conductive whereas the receiver supressor 19 is cut off by means of a bias supply 45.

2. *Incoming speech*

When incoming speech signals appear in the receiver branch of the hybrid arrangement and the transmitter branch carries no outgoing speech signals, the condition is as follows:

The incoming speech signals are supplied through the input transformer 21 to the series branches of the receiver suppressor 19 and the control voltage generator 31.

After amplification of that frequency-band of the incoming speech[1] frequencies in the pentode amplifier 34—38, which is tuned to these frequencies, the output voltage of said amplifier causes the output capacitor 41 to be rapidly charged through the rectifier arrangement 39

[1] Signals which correspond to the important speech.

and the series diode 42 which is only conductive to charge currents.

The charge time constant of the output capacitor 41 is very small, for example 1 millisecond, so that, when intelligence signals appear in the receiver branch, the pentode 43, which normally is conductive is cut off substantially without time delay by a voltage of negative polarity which is produced across the output capacitor 41. The resulting anode voltage increase is impressed through the control lead 32 upon the transmitter suppressor 8 and the receiver suppressor 19 so that the said receiver suppressor becomes conductive and the said transmitter suppressor is cut off.

Choosing the bias voltages applied to said suppressors from the bias supplies 44 and 45, respectively, to be slightly different ensures that the transmitter suppressor 8 is cut off shortly before the receiver suppressor 19 becomes conductive. This prevents received speech signals from circulating and being re-transmitted.

After the receiver suppressor 19 has become conductive it can only be cut off again with time delay, for the discharge time constant of the output capacitor 41, which is determined by the leak resistor 40, is made such (for example from 100 to 200 milliseconds) that the condition of the receiver suppressor is not changed during any intervals between syllables and words of the incoming speech. This also prevents received speech signals from being re-transmitted when they should be reflected in the subscriber's line.

Since, when the receiver suppressor 19 is conductive, the shunt resistors 28 and 30 connected in the series branches are short-circuited by the diodes 24 and 26 which are then conductive, the minimum signal level required to keep said receiver suppressor conductive is lower than the incoming signal level required to make the said receiver suppressor conductive. Thus, mutilation of incoming speech by instability of the suppressor control due to a sudden decrease of the level of the incoming speech signals is avoided.

3. *Outgoing speech*

When speech signals required to be transmitted via the transmitter branch are produced, there being no incoming speech signals, the receiver suppressor 19 is cut off and the transmitter suppressor 8 is conductive, so that the speech signals can be transmitted without the aid of the suppressor control, which prevents mutilation of outgoing speech signals.

Any noise and interference signals which are received in the receiver branch during transmission are highly damped in the cut off receiver suppressor 19. Since the selective amplifier 34 which is used in the control voltage generator 31, amplifies only a small part of the total noise output from the received speech band and the speech voltages set up in this partial speech band are comparatively strong, the signal-to-noise ratio for said amplifier is comparatively favorable and can comparatively readily be adjusted so that in the absence of speech signals the voltage produced at the output of the rectifier arrangement 39 is not sufficient to cause a change of the suppressor positions. Consequently, outgoing speech signals cannot be interrupted by incoming noise and interference signals.

4. *Incoming caller interrupts outgoing caller*

If during the condition in which there were outgoing speech signals and no incoming speech signals, incoming speech signals are produced, they will cause substantially without delay, i. e. within 1 to 2 milliseconds, the setting up of an output voltage from the control voltage generator 31. The suppressor position is in this event changed, so that the receiver suppressor 19 is made conductive whereas the transmitter suppressor 8 is cut off.

5. *The outgoing caller takes over*

When there are incoming speech signals, the transmitter suppressor 8 is cut off and the receiver suppressor 19 is conductive. The control voltage generator, which is connected to the receiver suppressor 19, supplies an output voltage. In these conditions outgoing speech signals cannot be transmitted immediately.

The transmission of outgoing speech signals is only possible when there is an interval in the incoming speech signals which exceeds the discharge time constant of the output capacitor 41 which is connected to the rectifier arrangement 39. This time constant, as has been mentioned hereinbefore, in view of intervals between syllables and words of the incoming speech, preferably is approximately from 100 to 200 milliseconds. Thus, an outgoing speech signal can only be transmitted after the occurrence of such an interval in the incoming speech signals and provided no incoming speech signals are received in this interval.

In order to prevent, in the case of unfavorable transmission conditions, any noise within the partial frequency band comprising the most important speech frequency components which might circulate in the connection during outgoing speech, from affecting the suppressor condition existing in the counter station, it has proved of advantage to connect between the tapping points on the shunt resistors 27, 29 a series circuit which is tuned to the above-mentioned most important speech frequency components (from 700–900 cycles per second) in order to attenuate those frequency components of the received noise to which the control voltage generator in the counter station is particularly sensitive. The said series circuit is shown by broken lines in the figure and comprises a capacitor 46 and a coil 47.

As will be seen from the above, in the described hybrid arrangement the use of simple and particularly conveniently arranged suppressor control means in combination with a special receiver suppressor ensures a very effective discrimination between the speech signals and noise and interference signals so that the receiver suppressor can replace the noise suppressor normally provided in the receiver branch, provided that the control periods are suitably chosen.

The sensitivity of the suppressor control means is adjustable in a simple manner by means of a potentiometer 48 which is connected in the input circuit of the selective amplifier 34—38.

In order to reduce relative variations in the input impedance of the receiver suppressor which occur when said suppressor is opened and closed, which reduction may be particularly desirable in the absence of the amplifier 17, the suppressor input can be connected via a connecting network comprising resistors 49, 50 and 51 to the input transformer 21.

While the invention has been described by means of a specific example and in a specific embodiment, I do not wish to be limited thereto, for obvious modifications will occur to those skilled in the art without departing from the spirit and scope of the invention.

What is claimed is:

1. A radio-telephone hybrid system comprising a hybrid coil, signal conducting means connected to said hybrid coil, a transmitting branch connected to said hybrid coil, a transmission suppressor connected in said transmitting branch, a receiving branch connected to said hybrid coil, a reception suppressor connected in said receiving branch, said reception suppressor comprising series-connected sub-branches, two unidirectionally conducting elements connected in series in each sub-branch of said reception suppressor, said last-mentioned unidirectionally conducting elements being connected to conduct in the reception direction of received signals, a shunt resistor connected across said unidirectionally conducting element of said reception suppressor, means for maintaining the unidirectionally conducting elements of said reception suppressor in a normally non-conducting condition, means for generating a control voltage comprising a selective amplifier having an input circuit connected between the junctions of the unidirectionally conducting elements of each sub-branch of said reception suppressor and means for tuning said selective amplifier to the speech frequency range of received intelligence signals, and means for applying said control voltage to said transmission suppressor and said reception suppressor thereby to render said transmission suppressor non-conducting and render said reception suppressor conducting upon the occurrence of an intelligence signal in said receiving branch.

2. A radio-telephone hybrid system comprising a hybrid coil, signal conducting means connected to said hybrid coil, a transmitting branch connected to said hybrid coil, a transmission suppressor connected in said transmitting branch, a receiving branch connected to said hybrid coil, a reception suppressor connected in said receiving branch, said reception suppressor comprising series-connected sub-branches, two unidirectionally conducting elements connected in series in each sub-branch of said reception suppressor, said last-mentioned unidirectionally conducting elements being connected to conduct in the reception direction of received signals, a shunt resistor connected across each unidirectionally conducting element of said reception suppressor, means for maintaining the unidirectionally conducting elements of said reception suppressor in a normally non-conducting condition, means for generating a control voltage comprising a selective amplifier comprising an electron discharge tube having a cathode and having an input circuit including said cathode connected between the junctions of the unidirectionally conducting elements of each sub-branch of said reception suppressor, a feedback resistor connected to said cathode and means for tuning said selective amplifier to the speech frequency range of received intelligence signals comprising a series resonant circuit connected across a portion of said feedback resistor and tuned to said speech frequency range, and means for applying said control voltage to said transmission suppressor and said reception suppressor thereby to render said transmission suppressor non-conducting and render said reception suppressor conducting upon the occurrence of an intelligence signal in said receiving branch.

3. A radio-telephone hybrid system comprising a hybrid coil, signal conducting means connected to said hybrid coil, a transmitting branch connected to said hybrid coil, a transmission suppressor connected in said transmitting branch, said transmission suppressor comprising series-connected sub-branches, a unidirectionally conducting element connected in series in each sub-branch of said transmission suppressor, said last-mentioned unidirectionally conducting elements being connected to conduct in the transmission direction of transmitted signals, means for maintaining the unidirectionally conducting elements of said transmission suppressor in normally conducting condition, a receiving branch connected to said hybrid coil, a reception suppressor connected in said receiving branch, said reception suppressor comprising series-connected sub-branches, two unidirectionally conducting elements connected in series in each sub-branch of said reception suppressor, said last-mentioned unidirectionally conducting elements being connected to conduct in the reception direction of received signals, a shunt resistor connected across each unidirectionally conducting element of said reception suppressor, one of the shunt resistors of each of said sub-branches having a tapping point thereon, a first series resonant circuit connected between said tapping points and tuned to said speech frequency range, means for maintaining the unidirectionally conducting elements of said reception suppressor in a normally non-conducting condition, means for generating a control voltage comprising a selective amplifier comprising an electron discharge tube having a cathode and having an input circuit including said cathode connected between the junctions of the unidirectionally conducting elements of each sub-branch of said reception suppressor, a feedback resistor connected to said cathode and means for tuning said selective amplifier to the speech frequency range of received intelligence signals comprising a second series resonant circuit connected across a portion of said feedback resistor and tuned to said speech frequency range, means for applying said control voltage to said transmission suppressor and said reception suppressor thereby to render said transmission suppressor non-conducting and render said reception suppressor conducting upon the occurrence of an intelligence signal in said receiving branch.

References Cited in the file of this patent

UNITED STATES PATENTS

| | | |
|---|---|---|
| 2,488,577 | Bonner | Nov. 22, 1949 |
| 2,568,397 | Jefferson | Sept. 18, 1951 |